United States Patent [19]

Atwell et al.

[11] Patent Number: 5,036,129
[45] Date of Patent: Jul. 30, 1991

[54] FLAME RETARDANT HOT MELT ADHESIVE COMPOSITIONS

[75] Inventors: Ray W. Atwell, W. Lafayette; Nicolai A. Favstritsky, Lafayette; John P. Stallings, Lafayette; Enrico J. Termine, Lafayette, all of Ind.

[73] Assignee: Great Lakes Chemical Corporation, West Lafayette, Ind.

[21] Appl. No.: 510,087

[22] Filed: Apr. 17, 1990

[51] Int. Cl.$^5$ .................. C08J 91/06; C08L 91/06
[52] U.S. Cl. .................................... 524/278; 524/273; 524/487; 524/488; 524/489; 524/272; 525/288
[58] Field of Search .............. 524/272, 273, 278, 487, 524/488, 489; 525/288

[56] References Cited

U.S. PATENT DOCUMENTS

| | | |
|---|---|---|
| 3,034,939 | 5/1962 | Newkirk et al. . |
| 4,325,853 | 4/1982 | Acharya et al. . |
| 4,404,299 | 9/1983 | Decroix . |
| 4,727,107 | 2/1988 | McConnell et al. . |

Primary Examiner—Paul R. Michl
Assistant Examiner—U. K. Rajguru
Attorney, Agent, or Firm—Woodard, Emhardt, Naughton Moriarty & McNett

[57] ABSTRACT

Flame retardant hot melt adhesives include ethylene vinyl acetate having grafted thereon a ring-halogenated styrene. The compositions may also include homopolymers of the styrene monomer of equivalents, as well as non-halogenated ethylene vinyl acetate. Tackifying agents, waxes, anti-oxidants and other additives may also be included.

28 Claims, No Drawings

FLAME RETARDANT HOT MELT ADHESIVE COMPOSITIONS

BACKGROUND OF THE INVENTION

1. Field of the Invention

The present invention relates to the field of composite useful in the manufacture of hot melt adhesives and to the adhesive compositions themselves, and particularly to the preparation of flame retardant hot melt adhesives containing ethylene vinyl acetate.

2. Description of the Prior Art

A hot melt adhesive is generally manufactured from a mixture of three components: a thermoplastic resin capable of providing cohesion of the mixture, a petroleum resin having a tackifying effect, and a paraffin or a microcrystalline polymeric wax capable of adapting the viscosity of the mixture to the processing and use conditions of the adhesive. In choosing the thermoplastic resin part of the mixture, good properties are sought in respect to heat stability and adhesiveness. The thermoplastic resins commonly used in compositions for the manufacture of hot melt adhesives have included copolymers of ethylene and vinyl esters, particularly vinyl acetate, or copolymers of ethylene and alkyl acrylates, particularly ethyl acrylate and butyl acrylate.

A typical hot melt adhesive formulation is described in U.S. Pat. No. 4,325,853, issued to Acharya et al. on Apr. 20, 1982. This patent indicates that a typical adhesive comprises, for example, ethylene copolymer, a tackifier and a wax. The Acharya patent is directed to the particular use of alkenyl succinic anhydride in combination with ethylene copolymer and a tackifying resin. It is indicated that wax-like materials and anti-oxidants may also be used. Among the ethylene copolymers mentioned are ones with vinyl acetate or with acrylic and methacrylic acid.

A general form of hot melt adhesive is also described in U.S. Pat. No. 4,404,299, issued to Decroix on Sep. 13, 1983. The Decroix patent indicates the adhesive to conventionally include a thermoplastic resin, a tackifying resin, and a paraffin or other wax-like substance for modifying the melt viscosity. Particularly described in the Decroix patent is the use of a terpolymer of ethylene and minor parts of alkyl acrylate or methacrylate and of maleic anhydride.

While ethylene vinyl acetate (EVA) has been found to be well suited to use in hot melt adhesives, there has remained a desire to improve the flame retardancy of EVA without adversely affecting the other desirable properties of EVA. Approaches to this problem have included the modification of EVA directly or the addition of flame retardants into the overall adhesive formulation.

Hot melt adhesive formulations can be made flame retardant by the addition of halogenated liquid and/or solid additives. However, liquid additives weaken the adhesive bond strengths by dilution and plasticization of the adhesive formulation. On the other hand, solid additives act as fillers, and can result in settling and lower tensile strengths. Present adhesive dispensing systems are not generally equipped with stirrers, and solid insoluble flame retardant additives which settle out of the adhesive can clog feed lines.

U.S. Pat. No. 3,034,939, issued to Newkirk, et al. on May 15, 1962, discusses fire extinguishing properties for a hot melt adhesive composition containing chlorinated biphenyls and/or chlorinated paraffins as flame retardants. The use of the former material is now EPA regulated due to PCB contamination problems. The latter material is subject to dehydrochlorination if allowed to stand at the 270°-350° F. temperature required for use. Additionally, antimony trioxide and calcium carbonate (which tend to settle out) are required. There is no adhesive data in the Newkirk, et al. patent.

Other commercial flame retardants, such as decabromodiphenyl oxide (DDPO) are also used in flame retardant hot melt adhesives, as described in U.S. Pat. No. 4,727,107, issued to McConnell, et al. on Feb. 23, 1988. DDPO is an insoluble solid melting at 300°-315° C., which acts as a filler and can settle out of the adhesive formulation. The McConnell patent claims the use of decabromodiphenyl ether in flame retardant hot melt adhesives for polyurethane foams and fabrics. The use of antimony oxide is also claimed. These materials will settle out of the adhesive mixture. Also, formulating the adhesive is cumbersome due to the pre-melting and mixing of the flame retardant and antimony oxide with polyester to form a concentrate which is then back-added to the base polyester for application. No adhesive data is given in the McConnell patent.

The graft ethylene vinyl acetate polymers used in the present invention do not suffer the drawbacks of having insoluble flame retardants which act as fillers, increase melt viscosity, and require the use of solid antimony synergists or other flame retardant enhancing agents. Since the grafts are polymeric and compatible in the adhesive formulation, they do not perform like liquid flame retardants which can weaken and migrate from adhesive bonds.

SUMMARY OF THE INVENTION

In one aspect of the present invention there is provided a flame retardant hot melt adhesive composition including ethylene vinyl acetate having grafted thereon a ring-halogenated styrene. The flame retardant graft copolymer is represented by the formula:

$$\begin{array}{c} EVA \\ | \\ (S)_n \end{array}$$

in which n is an integer $>1$, EVA is ethylene vinyl acetate, and S is a side chain grafted to the EVA and having monomeric units of the formula:

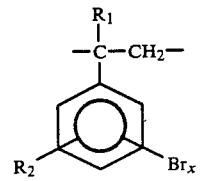

wherein $x = 1$ to 4, $R_1$ is H or $CH_3$, and $R_2$ is H or a $C_{1-4}$ lower alkyl group. The compositions may also include homopolymers of the styrene monomer or an equivalent, as well as non-halogenated ethylene vinyl acetate. Tackifying agents, waxes, anti-oxidants and other additives may also be included.

It is an object of the present invention to provide hot melt adhesives which have desirable physical properties and improved flame retardancy.

A further object of the present invention is to provide hot melt adhesives which do not include flame retardant additives which adversely affect physical properties, such as melt viscosity, or which settle out of the composition.

Further objects and advantages of the present invention will be apparent from the description which follows.

DESCRIPTION OF THE PREFERRED EMBODIMENT

For the purposes of promoting an understanding of the principles of the invention, reference will now be made to preferred embodiments of the invention and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

Hot melt adhesives are used in a variety of applications. They are generally characterized as solid, thermoplastic materials which quickly melt upon heating, and which then set to a firm bond on cooling. Since hot melt adhesives offer almost instantaneous bonding, they are well suited to automated operation. In general, they are low cost, low-strength products, which are entirely adequate for bonding cellulosic and other materials. Such adhesives have specific uses, for example, for bookbinding, food cartons, side seaming of cans, and miscellaneous packaging applications.

Various formulations for hot melt adhesives are well known in the art. Ingredients typically include a thermoplastic resin such as polyethylene or polyvinyl acetate, along with a tackifying agent and a wax-like material. Compositions including ethylene vinyl acetate (EVA), or for which EVA is useful, are known in the art. There has remained a desire for EVA containing hot melt adhesives that retain the desirable properties of EVA, but which have improved flame retardancy as afforded by the present invention.

The present invention provides novel hot melt adhesive compositions having advantageous adhesive properties and increased flame retardancy. The compositions include a modified ethylene vinyl acetate which has been grafted with ring halogenated styrenes, such as dibromostyrene or the like. This modified EVA may be used alone as a hot melt adhesive, or more typically is used in combination with other standard ingredients of hot melt adhesives, such as the tackifier and wax previously mentioned. It is an aspect of the present invention that the modified EVA is useful essentially equally to the conventional, non-halogenated EVA. For prior compositions with which EVA has been used or could be used, the modified EVA of the present invention has been found to be an equivalent substitute in terms of compatibility, but superior in terms of flame retardancy. Thus, the present invention relates to the use of the described, grafted EVA as a substitute for some or all of the EVA which has otherwise been used in the variety of known hot melt adhesive formulations.

The present invention utilizes compositions which have physical properties comparable to that of ethylene vinyl acetate, but which have improved flame retardancy. In the broadest sense, ethylene vinyl acetate is modified by grafting a ring-brominated vinyl aromatic onto the ethylene vinyl acetate. The presence of the bromine contributes to the flame retardancy of the resulting polymer. A significant portion of the bromine present in the EVA compositions utilized in the present invention is grafted onto the ethylene vinyl acetate through the monomeric unit. In addition, it is contemplated that the EVA compositions may also include bromine in the form of homopolymers of the monomer used in grafting the ethylene vinyl acetate, or of comparable monomer. Although not to be considered limiting of the present invention, it is believed that the compatibility of the grafted ethylene vinyl acetate and the homopolymer contributes to the desirable properties of the resulting composition.

In accordance with the above discussion, the flame retardant hot melt adhesives of the present invention include a flame retardant polymer composition comprising a graft copolymer represented by the formula:

in which n is an integer $>1$, EVA is ethylene vinyl acetate, and S is a side chain grafted to the EVA and having monomeric units of the formula:

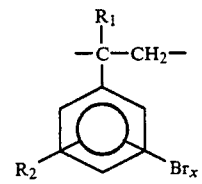

wherein $x = 1$ to 4, $R_1$ is H or $CH_3$, and $R_2$ is H or a $C_{1-4}$ lower alkyl The graft base may alternatively comprise polymers of ethylene and polar co-monomers other than vinyl acetate, such as acrylic or methacrylic acid or esters thereof, maleate esters, or blends of these copolymers. Additionally, the base may comprise blends of EVA or these other copolymers with polyethylene homopolymer. For the purposes of the following discussion, the description is directed in particular to the use of EVA as the graft base. It is to be understood, however, that these alternative graft bases may be used in lieu of the EVA.

The modified ethylene vinyl acetate may be produced using conventional grafting techniques, and for this purpose the particular EVA used is not critical so long as it undergoes suitable graft polymerization to yield the indicated products. The EVA may vary from 5–95% ethylene and from 95–5% vinyl acetate. For example, a suitable EVA for modification for use in the present invention is one available under the trademark "ULTRATHENE UE-639-35", produced by Quantum, USI Division. This copolymer has about 72% ethylene and about 28% vinyl acetate. EVA copolymers having melt indices of 2–4000 (ASTM D-1238, 190° C., 2.16 kg) are useful for the grafting reaction. The preferred ethylene vinyl acetate has a vinyl acetate content of about 18–33%, and has a melt index of 100–500.

The ethylene vinyl acetate is graft polymerized with a ring-brominated vinyl aromatic which is also optionally alpha or ring-substituted with one or more aliphatic groups including lower alkyl groups such as methyl, ethyl, and propyl and butyl isomers. This monomer is preferably a styrene having 1 to 4, and more preferably 2 to 4, ring-substituted bromines. However, it will be appreciated that other monovinyl aromatics, as described, function similarly to styrene in grafting procedures and accordingly will produce grafted EVA compositions which are also useful with the present invention. For the monomer, methyl is a preferred optional alpha-substituted alkyl group and $C_{1-4}$ lower alkyls are preferred optional ring-substituted alkyl groups. Correspondingly chlorinated styrenes are also useful.

Accordingly, preferred brominated monomers suitable for preparation of the graft polymerized EVA products have the formula:

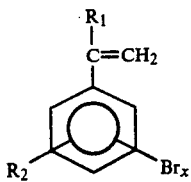

wherein x=1 to 4, $R_1$ is H or $CH_3$, and $R_2$ is H or a $C_{1-4}$ lower alkyl group.

In accordance with this formula the preferred styrene monomer has 1 to 4 bromines per styrene. Also useful are mixtures containing these mono-, di-, tri-, and/or tetrabromostyrenes. It is desirable that the monomer material used for the graft polymerization be liquid at room temperature (about 25° C.). Mixtures may accordingly be used which are liquid at room temperature and which have styrenes with varying degrees of bromination to achieve a high percentage of bromine in the monomer material. Pentabromostyrene is not a preferred styrene monomer. In experiments using pentabromostyrene a suitable grafting of the ethylene vinyl acetate did not result. In this regard, pentabromostyrene (30 g), EVA (30 g) and dicumyl peroxide (0.6 g) were fluxed at 180° C. in a small Brabender mixer for seven minutes. A gas chromatography analysis of the mixture showed that 77.4% of the pentabromostyrene failed to graft to the ethylene vinyl acetate.

In another aspect, it is preferred that the stated levels of bromine be achieved with at least about 85% of the brominated monomeric units being di-, tri- or tetra-bromo units or mixtures thereof. The most preferred monomer is dibromostyrene, and preferably at least about 80% of the brominated monomeric units are dibromo units. In commercial form, dibromostyrene commonly includes minor levels of mono and tribromostyrene. For example, the applicants have used dibromostyrene commercially available from Great Lakes Chemical Corporation of West Lafayette, Indiana. This commercial dibromostyrene has contained about 15-18% monobromostyrene and about 3% tribromostyrene by weight, and overall includes about 99.6% brominated styrenes. The styrene monomer may also contain other, non-interfering materials, such as storage stabilizers known and used in the field to inhibit premature polymerization. As examples, these commonly include phenols and compounds of sulfur, nitrogen and phosphorous.

The ring-brominated vinyl aromatic is grafted to the ethylene vinyl acetate base using suitable graft polymerization techniques which may be performed, for example, in solution, suspension, emulsion or bulk procedures. Such grafting techniques include irradiation, peroxidation by exposure to oxygen at elevated temperatures, and abstraction of protons by free radical initiators. Among these, the latter technique is preferred, with appropriate free radical initiators including organic peroxides such as dicumyl peroxide, di-t-butyl peroxide, t-butylperbenzoate and t-butyl hydroperoxide.

Typically, the EVA grafts are prepared in a Brabender large bowl heated mixer or extruder. The EVA is charged to the bowl, mixed, and fluxed at 170° C. The dibromostyrene (DBS) is then added at 10-400% based on weight of the EVA, the preferred concentration being 30-300%. The initiator organic peroxide and a chain transfer agent may be dissolved in the DBS. Typically, 1-5% each of peroxide and chain transfer agent is dissolved in the DBS, with 2% of each being preferred. The resulting solution is then added to agitated molten ethylene vinyl acetate. The grafting is preferably performed in a kneading type mixer, such as a Banbury mixer, or in an extruder or a two-roll mill, although other suitable mixers known in the art can also be used.

Additionally, the grafting is carried out at a suitable pressure and temperature and for a duration sufficient to yield the desired end product. The grafting proceeds readily at atmospheric pressure, as well as at the elevated pressures encountered in commonly used plastics processing equipment. Generally, the temperature will be elevated sufficiently to reduce the viscosity of the molten ethylene vinyl acetate and to ensure thorough mixing. Moreover, where free radical initiators are used, this temperature will be high enough to promote decomposition of the initiator resulting in rapid polymerization of the monomer. Reaction temperatures may, for example, be in the range of 50°-300° C., depending on the initiator half life. For instance, dicumyl peroxide has a 10 minute half life at 155° C. and a one minute half life at 180° C., and using temperatures of 150°-180° C. gives the desired DBS grafted EVA with dicumyl peroxide.

The duration of the grafting procedure will depend upon the temperature as well as the grafting technique used. In free radical initiated grafting, the duration will also depend upon the chosen initiator and the efficiency of mixing. Generally, however, durations ranging from about 1 second to several hours can be used, with about 10 to about 300 seconds resulting in an efficient polymerization. By way of example, with 2% dicumyl peroxide in DBS, the reaction is complete in 0.5-10 minutes in a bowl mixer at 150° C., and is completed in less than 30 seconds residence time in a 30 mm Werner and Pfleiderer twin screw extruder.

It is an aspect of the present invention that the EVA compositions used with the hot melt adhesives have monomer which is indeed grafted onto the EVA backbone, although homopolymer will also typically be present. This has been demonstrated in the following manner. A 50/50 dibromostyrene-EVA graft copolymer (by weight), prepared as described in the examples hereafter, was melted and stirred at 195° C. and allowed to stand at that temperature for seven hours. Each of the top, middle and bottom of the material was analyzed and found to contain 28% Br +/−0.07%. In contrast, a 50/50 (by weight) mixture of polydibromostyrene (PDBS) and EvA were melted and stirred together at 195° C. After standing at 195° C. for seven hours, two distinct phases were evident. The top phase was found to contain 5.1% Br, and the bottom phase contained 55.2% Br. This indicates that about 94% of the PDBS had separated from the EVA and that the two polymers were largely immiscible in each other.

As another demonstration of the grafting of, for example, the dibromostyrene onto EVA, the following experiment was conducted. First, it was determined that EVA dissolved in cyclohexane at a level of 2% EVA (by weight of cyclohexane), and that 2% polydibromostyrene was completely insoluble in cyclohexane. A mixture of cyclohexane and 2% each of polydibromostyrene and EVA was allowed to stand two days and was then filtered. The filtrate contained less than 0.05% Br (versus a theoretical 1.13%), indicating little if any dissolution of the polydibromostyrene. By comparison, the graft copolymer prepared according to the present invention was finely dispersed in cyclohexane at a level of 4% copolymer by weight of cyclohexane. The mixture was allowed to stand for two days, and was then filtered. The filtrate contained 0.43% Br (versus a theoretical 1.13%), indicating about 38% of the graft copolymer had dissolved under the conditions used. From these solubility experiments it is shown that the DBS/EVA graft copolymer is a distinct material, and is unlike a simple mixture of polydibromostyrene and EVA.

Graft polymerization will typically result in the production both of grafted ethylene vinyl acetate and of homopolymer of the selected monomer. It has been found that the grafted ethylene vinyl acetate and any homopolymer present remain well intermixed, even during processing. The homopolymer could alternatively be removed, but this is not necessary and the preferred composition therefore includes both grafted ethylene vinyl acetate and homopolymer.

In addition, the adhesive compositions may include non-halogenated EVA. Thus, the formulations will include an EVA component, which as used herein, is defined as including the graft EVA copolymer together with any amounts which may be present of the homopolymer of the grafting monomer and of the non-halogenated EVA.

The preferred EVA products used in the present invention have a flame retarding amount of bromine, about 1 weight % or more, based on the weight of the EVA. This bromine may be present either in the grafted ethylene vinyl acetate or in a homopolymer mixed with the grafted ethylene vinyl acetate. In any event, however, the grafted ethylene vinyl acetate copolymer includes at least about 0.5%, and more preferably at least about 1%, bromine by weight. In addition, the hot melt adhesives may include non-halogenated EVA, in which case it is preferred that there be included at least about 1% bromine by weight based on the EVA component, i.e. the combined weight of the grafted EVA, the homopolymer and the non-halogenated EVA.

The EVA component of the hot melt adhesives, including the grafted EVA, homopolymer and non-halogenated EVA, will generally include about 5% to about 50% bromine by weight of the EVA component, and more preferably about 15% to about 45% bromine by weight. The EVA component will preferably include about 1% to about 40% bromine based on the weight of the overall adhesive formulation with tackifier and wax, and more preferably about 1% to about 30%.

The EVA component may also be obtained from a bromine-concentrated EVA graft copolymer having about 10% to about 60% bromine by weight, or more preferably about 30% to about 50% bromine by weight, of the copolymer. The bromine content may come from the graft copolymer and any homopolymer present, but in any event at least about half of the bromine is present on the graft copolymers. In this approach, the grafted ethylene vinyl acetate copolymer is let down with non-halogenated ethylene vinyl acetate prior to use in the hot melt adhesive composition, to have the desired level of bromine content.

A certain amount of bromine may also be present as a part of unreacted monomer, but this form is not preferred and the amount of unreacted monomer is desired to be relatively low. The amount of unreacted monomer is preferably at most about 3% by weight, and more preferably at most about 1% by weight, of the EVA component. These low levels are generally achieved in the described preparation of the preferred products without the need for further processing steps. However, when desired the unreacted monomer can be removed, for example, by placing the graft polymerization products under vacuum.

The let down blends and other EVA compositions used in the present invention, and the resulting hot melt adhesives, have demonstrated excellent adhesive and flame retarding properties. The combination of improved flame retardancy and desirable physical properties provides a significant and unexpected advantage, and highlights the magnitude of the applicants' discoveries.

Additional materials which do not significantly interfere with the grafting procedure or with the resulting grafted EVA products can also be used as known in the art or determined by routine experimentation. For instance, reactive additives including chain transfer agents, such as 1-dodecanethiol, can be dissolved into the brominated monomer, prior to grafting, to control the molecular weight of the brominated graft component. Alkyl halides, amines, esters, ketones and mercaptans, for example, are also suitable chain transfer agents for limiting the extent of styrene polymerization, and thus the molecular weight of the styrene polymer chains. By controlling the molecular weight, the flow characteristics of the EVA product can be matched to that desired for use in a particular hot melt adhesive formulation. As previously indicated, the product of the graft polymerization will normally contain brominated styrene polymer grafted to the ethylene vinyl acetate as well as brominated styrene homopolymer resulting from separate polymerization of the monomer. The chain transfer agent can be used to regulate the molecular weight of each.

Other reactive unsaturated comonomers can also be included during the grafting process to modify the properties of the resultant EVA composition. These can include maleic anhydride, styrene, chlormethylstyrene, acrylonitrile, methylmethacrylate, acrylic acid, butene, butadiene, acrylamide and many others as known in the art. Modifications which can be achieved by addition of other materials during the grafting process include alterations in color, clarity, lubricity, dyability, melt viscosity, softening point, thermal stability, ultraviolet stability, viscoelastic behavior, polarity, biodegradability, static charge dissipation, strength and stiffness.

Nonreactive materials can also be included in the grafting procedure to modify EVA product properties. As examples, anti-oxidants, ultraviolet absorbers, anti-static agents, pigments, dyes, nucleating agents, fillers, slip agents, lubricants, anti-blocking agents, plasticizers, and/or anti-microbials can be included. These materials can be incorporated into the ethylene vinyl acetate prior to or during the grafting process. Alternatively, these materials can be added in a separate compounding step, which provides the advantage of avoiding possible interference by these additives with the grafting chemistry.

Other flame retardants (aside from the brominated styrene grafts) can also be included in the graft polymerization product. These may be reactive flame retardants such as bis(2-chloroethyl)vinylphosphonate or acrylic acid esters of halogenated alcohols, or inert flame retardants such as antimony oxide, triphenylphosphate, or hexabromocyclododecane.

Further details and specific examples of the preparation of the grafted EVA compositions useful in the present invention are contained in the copending patent application, Ser. No. 07/510,055, field on 04/17/, 1990. Applicants incorporate herein by reference the additional disclosure contained in said application. It will be appreciated, however, that the particular manner of production of the grafted EVA compositions used in the hot melt adhesives of the present invention is not critical, and that other methods for production of the described EVA component are suitable. Further description of methods for the production of grafted EVA materials as defined herein is therefore not believed to be necessary.

In addition to the graft ethylene vinyl acetate, the hot melt adhesives of the present invention may include tackifiers, wax-like materials, and other additives conventionally used in EVA-based adhesive formulations. In general, the graft EVA is useful with the variety of adhesive compositions in which EvA is useful or compatible. It is an aspect of the present invention that in such hot melt adhesives including ethylene vinyl acetate, there is provided the improvement if using the described graft EVA copolymers. These adhesives may include the graft copolymer alone or in combination with the homopolymer and/or non-halogenated EVA. Prior art formulations may similarly be modified by replacing either some or all of the previously-used, non-halogenated EVA with the grafted EVA of the present invention, with or without the homopolymer also being present.

Any tackifiers compatible and useful with the graft EVA and overall hot melt adhesive compositions may be combined therewith. The tackifier will be added to provide an amount effective to give a desired tack or adhesiveness. It will be understood by those in the art that the selection of the tackifying agent and its amount is well within the skill in the art, and may be determined without undue experimentation. Various types and levels of tackifier may be chosen to adapt the hot melt adhesive formulation to particular applications. The specifics regarding the tackifying agent are therefore not critical to the present invention. A number of commercial tackifiers are readily available. Common tackifiers used in the art also include petroleum or rosin esters and others described in the previously cited U.S. Pat. Nos. 4,404,299 and 4,325,853, and these disclosures are hereby incorporated by reference.

Similarly, any wax-like materials, typically synthetic and petroleum waxes, compatible and useful with the graft EVA and overall hot melt adhesive compositions may be combined therewith. The wax-like materials are added to provide an amount effective to give a desired melt viscosity for the adhesive, and may also be included as a diluent to reduce cost of the composition. It will again be appreciated that the selection of the wax material and its amount is well within the skill in the art, and may be determined without undue experimentation. Various types and levels of waxes may be chosen to adapt the hot melt adhesive formulation to particular applications. The specifics regarding the wax materials are therefore not critical to the present invention. A number of commercial waxes are readily available. Common waxes used in the art also include paraffin wax, microcrystalline Polymeric wax, Fischer-Tropsch wax, and others described in U.S. Pat. Nos. 4,404,299 and 4,325,853, and these disclosures are hereby incorporated by reference.

Other ingredients may also be included. For example, anti-oxidants such as hindered phenols and organic phosphites are typically used to prevent coloration and viscosity changes with heat aging. Also, diluents such as organic phosphates may also be beneficial in certain applications.

The graft ethylene vinyl acetate copolymers, together with such other ingredients as are used, are combined in relative amounts to give the desired physical properties for the hot melt adhesive. For example, the hot melt adhesive may generally include from about 40% to about 60 weight % of the graft EVA component; from about 25 to about 50 weight % of tackifier; and from about 10 to about 30 weight % of wax. The adhesive formulation may consist essentially of the EVA component, tackifier and wax-like material. As used in this context, the term EVA component refers, as before, to the graft ethylene vinyl acetate alone or in combination with either or both homopolymer (of the grafting monomer or equivalent) and non-halogenated EVA. Of course, in the case of an adhesive consisting essentially of these three components, other non-interfering ingredients may also be present, such as an anti-oxidant, mineral or organic fillers such as carbon black or calcium carbonate, etc.

The adhesive compositions of the present invention are solids at room temperature, but have melting points and melt viscosities in a range such that they can be readily applied to appropriate substrates using conventionally employed hot melt techniques and equipment. The compositions can be formulated to have ring and ball softening points within desired ranges, typically 80° C. to 105° C., and viscosities also within desired ranges, for example between 500 cps and 20,000 cps at 400° F.

The preparation of the compositions according to the invention does not present any difficulty and is typically carried out by homogeneous mixing of the various components at a suitable temperature, typically between 100° C. and 250° C. For example, a suitable adhesive is prepared by simply heating the grafted ethylene vinyl acetate, and any other ingredients used, and stirring at 175° C. to obtain a homogeneous mixture. In a more general sense, past methods of preparation used for compositions containing non-halogenated EVA are equally useful for the preparation of the composition as improved by the use of grafted EVA.

The hot melt adhesive compositions of the present invention are useful for the variety of applications to which EVA-based adhesives are suited. Examples of such uses include the preparation of laminated structures, book binding, packaging, etc. The inventive compositions, as a hot melt, are applied in conventional fashion to at least one of the surfaces to be bonded. The appropriate surfaces are then joined together, typically under at least light pressure, and the assembly is cooled to ambient temperature to solidify and set the adhesive.

The invention will be further described with reference to the following specific Examples. However, it will be understood that these Examples are illustrative and not restrictive in nature. In the following Examples, percents indicated are percents by weight unless indicated otherwise.

EXAMPLE 1

Hot melt adhesive formulations were prepared by thoroughly mixing the ingredients at room temperature, followed by melting and mixing in a 175° C. oven. For example, 50 grams of ethylene vinyl acetate grafted with dibromostyrene (the grafted composition containing 29% Br by weight) were mixed with 20 grams of a wax material available commercially as FT-Wax 300 (Astor Wax Corp.) and 30 grams of a commercial tackifying agent Wingtack 95 (Goodyear Tire and Rubber Co.) in a container. The container and contents were heated for two hours in a 175° C. oven, and the molten mixture thoroughly stirred. The stirring was repeated after maintaining the mixture for an additional hour at 175° C., and the mixture poured out on a Teflon sheet to cool. The mixture was also applied hot directly to the substrates for test.

It is essential that the ring-halogenated styrene be grafted to the EVA. As a physical mixture, homopolymerized dibromostyrene (DBS) and non-halogenated EVA are not compatible in the hot melt formulation, making it unworkable. From the results in Table 1, it is shown that a 50/50 (wt.) mixture of polymerized dibromostyrene and EVA are not compatible with one another and the resulting adhesive formulation exhibited no flow in a melt flow apparatus. The corresponding dibromostyrene/EVA graft copolymer was homogeneous and the prepared adhesive flowed through the apparatus as a useable adhesive, exhibiting good flow properties.

TABLE 1

Hot Melt Adhesive Formulations DBS Homopolymer with EVA v. DBS-EVA Graft

|  | Homopolymer |  | Graft |  |
|---|---|---|---|---|
| ELVAX 410[1] | 25 | — | — | — |
| UE 63935[2] | — | 25 | — | — |
| DBS Homopol[3] | 25 | 25 | — | — |
| 50/50 410[1]/DBS Graft | — | — | 50 | — |
| 50/50 63935[2]/DBS Graft | — | — | — | 50 |
| FT-300 Wax[5] | 20 | 20 | 20 | 20 |
| Wingtack 95[6] | 30 | 30 | 30 | 30 |
| MFI[7] | 0[4] | 0[4] | 1.65 | 1.67 |

[1]Elvax 410, DuPont Co.
[2]Ultrathene UE-639-35, Quantum, USI Div.
[3]6000 M.W.
[4]Phase Separation, would not flow
[5]FT-300 Wax, Astor Wax Corp.
[6]Wingtack 95, Goodyear Tire & Rubber Co.
[7]125° C./325 g, g/10 minutes, ASTM D-1238

High melt flow rates are desirable for transport of the adhesive to the substrate. The use of 1-dodecanethoiol (DDT) in the grafting reacting reduces the molecular weight of the graft EVA, and gives copolymers of increasing melt flow indicies. Thus, increasing DDT from 0–1.5% affects the melt flow of the formulaed adhesive. Five different compositions were prepared by the method of Example 1, using the formulations shown in Table 2. The physical properties of these materials are shown in Table 3. Adhesive formulations with higher melt flow values than the control EVA formulation were obtianed. The oxygen index (a measure of non-flammability) is substantially improved using the EVA graft copolymers in place of non-halogenated EVA.

TABLE 2

Starting DBS/EVA Graft Copolymers Preparation (Values in %)

|  | Example Number | | | | |
|---|---|---|---|---|---|
|  | 1 | 2 | 3 | 4 | 5 |
| EVA[1] | 50.0 | 50.0 | 50.0 | 50.0 | 100.0 |
| DiCup[2] | 0.5 | 0.5 | 0.5 | 0.5 | — |
| DDT[3] | 0.0 | 0.5 | 1.0 | 1.5 | — |
| DBS[4] | 49.5 | 49.0 | 48.5 | 48.0 | — |

[1]EVA Ultrathene 639-35, USI Div. Quantum
[2]Dicumyl Peroxide
[3]1-Dodecanethiol
[4]Dibromostyrene

TABLE 3

|  | Physical Properties | | | | |
|---|---|---|---|---|---|
| Formulated Adhesive[5]: | 1 | 2 | 3 | 4 | 5 |
| Melt Flow Index[6] (g/10 min.) | 1.7 | 24.4 | 32.7 | 38.5 | 24.9 |
| Peel Strength[7] Lbs/in | 1.5 | 1.6 | 1.0 | 1.1 | 0.9 |
| Limiting Oxygen Index, % [8] | 28.0 | 28.0 | 28.0 | 28.0 | 21.0 |

[5]EVA or EVA graft, 30% Cumar R-6 (Neville Chemical Co.), 20% FT-300 Wax (Astor Wax Corp.)
[6]ASTM D 1238 125° C./325 g.
[7]ASTM D 1876-72
[8]ASTM D 2863-77

Many applications of flame retardant hot melt adhesives require a rating of V-O by Underwriters laboratory test UL-94. Several hot melt formulations were prepared with triphenyl phosphate (TPP) as a flame retardant synergist with both the DBS/EVA copolymer and decar bromodiphenyl oxide (DDPO). The results in Table 3 show a V-O rating is attained with the DBS-EVA copolymer while the corresponding DDPO formulations were only V-2 (indicating burning and dripping).

TABLE 4

Comparison of DBS/EVA Copolymers with Decabromodiphenyl Oxide in Hot Melt Adhesives

|  | Example Number | | | | | |
|---|---|---|---|---|---|---|
|  | 1 | 2 | 3 | 4 | 5 | 6 |
| DBS/EVA (50/50 graft) | 40 | 50 | 60 | — | — | — |
| TPP[1] | 30 | 20 | 10 | 30 | 20 | 10 |
| Wingtack Extra[2] | 28 | 28 | 28 | 28 | 28 | 28 |
| TNPP[3] | 2 | 2 | 2 | 2 | 2 | 2 |
| EVA[4] | — | — | — | 26 | 32 | 39 |
| DE-83R[5] | — | — | — | 14 | 18 | 21 |
| % Br | 11.6 | 14.5 | 17.4 | 11.6 | 14.5 | 17.5 |
| | Days at 350° F. | | | | | |
| Melt Flow Index[6] (g/10 min.) | 0 | 77 | 41 | 14 | 112 | 60 | 12 |
| | 1 | 93 | 41 | 13 | 102 | 41 | 13 |
| | 2 | 160 | 50 | 14 | 126 | 64 | 17 |
| UL-94 (1/16") | V-0 | V-2 | V-2 | V-2 | V-2 | V-2 |
| 1"180° Peel lbs[7] | 1.5 | 1.9 | 2.2 | 1.9 | 2.0 | 2.1 |

[1]Triphenyl phosphate, Monsanto Chemical Co.
[2]Goodyear Tire and Rubber Co.
[3]Tris(nonylphenylphosphite) Weston Chemical Company
[4]UE-639-35 Quantum Div. USI
[5]Decabromodiphenyl Oxide. Great Lakes Chemical Company
[6]ASTM D-1238, 177° C./325 g, 0.040" orifice
[7]ASTM D-1876-72

While the invention has been described in detail in the foregoing description and its specific Examples, the same is to be considered as illustrative and not restrictive in character. It is to be understood that only the preferred embodiments have been described, and that all changes and modifications that come within the spirit of the invention are desired to be protected.

What is claimed is:

1. A hot melt adhesive composition which comprises:
a tackifying resin;
a wax; and
a flame retardant ethylene vinyl acetate component including a graft copolymer composition having the formula:

$$\begin{array}{c} \text{EVA} \\ | \\ (S)_n \end{array}$$

wherein n is $>1$, EVA is ethylene vinyl acetate, and S is a grafted side chain having brominated monomeric units of the formula:

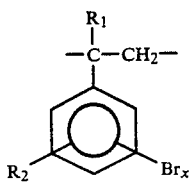

wherein $x = 1$ to 4, $R_1$ is H or $CH_3$, and $R_2$ is H or a $C_{1-4}$ lower alkyl group.

2. The hot melt adhesive composition of claim 1 in which said graft copolymer includes at least about 1% bromine by weight of graft copolymer.

3. The hot melt composition of claim 2 in which said graft copolymer includes about 1% to about 20% by weight bromine.

4. The hot melt composition of claim 1 in which said graft copolymer includes at least about 5% bromine by weight of the overall composition.

5. The hot melt composition of claim 4 in which said graft copolymer includes about 5% to about 30% bromine by weight of the overall composition.

6. The hot melt composition of claim 1 in which $R_1$ and $R_2$ are each hydrogen.

7. The hot melt composition of claim 1 in which at least about 80% of said brominated monomeric units have formulas wherein $x = 2$.

8. The hot melt composition of claim 1 and which consists essentially of said tackifying resin, said wax, and said flame retardant graft copolymer composition.

9. The hot melt composition of claim 8 and including about 40% to about 60% graft copolymer, about 25% to about 50% tackifying resin, and about 10% to about 30% wax.

10. The hot melt composition of claim 1 in which said ethylene vinyl acetate component further includes a homopolymer of said brominated monomeric units.

11. The hot melt composition of claim 10 in which said graft copolymer and said homopolymer together include at least about 1% bromine by weight of the combined weight of said graft copolymer and said homopolymer.

12. The hot melt composition of claim 10 in which said ethylene vinyl acetate component includes at least about 5% bromine by weight of the overall adhesive composition.

13. The hot melt composition of claim 12 and in which said ethylene vinyl acetate component includes about 5% to about 30% bromine by weight of the overall adhesive composition.

14. The hot melt composition of claim 10 and which consists essentially of said tackifying resin, said wax, said flame retardant graft copolymer composition and said homopolymer.

15. The hot melt composition of claim 10 in which said ethylene vinyl acetate component further comprises non-halogenated ethylene vinyl acetate.

16. The hot melt composition of claim 15 in which said graft copolymer and said homopolymer together include at least about 1% bromine by weight of the combined weight of said graft copolymer, said homopolymer and said non-halogenated ethylene vinyl acetate.

17. The hot melt composition of claim 15 in which said ethylene vinyl acetate component includes at least about 5% bromine by weight of the overall composition.

18. The hot melt composition of claim 15 and which consists essentially of said tackifying resin, said wax, said flame retardant graft copolymer composition, said homopolymer and said non-halogenated ethylene vinyl acetate.

19. In a hot melt adhesive composition including an ethylene vinyl acetate polymer, the improvement comprising using as the ethylene vinyl acetate polymer a flame retardant graft copolymer composition comprising:

$$\begin{array}{c} \text{EVA} \\ | \\ (S)_n \end{array}$$

wherein n is $>1$, EVA is ethylene vinyl acetate, and S is a grafted side chain having brominated monomeric units of the formula:

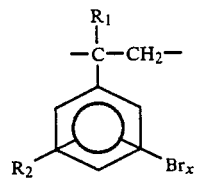

wherein $x$ 1 to 4, $R_1$ is H or $CH_3$, and $R_2$ is H or a $C_{1-4}$ lower alkyl group.

20. The improvement of claim 19 in which said graft copolymer includes at least about 1% bromine by weight of graft copolymer.

21. The improvement of claim 19 in which said hot melt adhesive composition consists essentially of a tackifying resin, a wax, and said flame retardant graft copolymer composition.

22. The improvement of claim 19 and which further comprises including in the hot melt adhesive composition a homopolymer of said brominated monomeric units.

23. The improvement of claim 22 in which said graft copolymer and said homopolymer together include about 1% to about 20% bromine by weight of the combined weight of said graft copolymer and said homopolymer.

24. The composition of claim 22 in which said hot melt adhesive composition consists essentially of a tackifying resin, a wax, said flame retardant graft copolymer composition and said homopolymer.

25. The improvement of claim 22 and which further comprises including in the hot melt adhesive composition a non-halogenated ethylene vinyl acetate.

26. The improvement of claim 25 in which said graft copolymer and said homopolymer together include about 1% to about 20% bromine by weight of the combined weight of said graft copolymer, said homopolymer and said non-halogenated ethylene vinyl acetate.

27. The improvement of claim 26 in which said hot melt adhesive composition consists essentially of a tackifying resin, a wax, said flame retardant graft copolymer composition, said homopolymer and said non-halogenated ethylene vinyl acetate.

28. A hot melt adhesive composition which comprises:
   a tackifying resin;
   a wax; and
   a flame retardant polymer component including a graft copolymer composition having the formula:

wherein n is $>1$, P is a polymer selected from the group consisting of: (a) copolymers of ethylene and a polar co-monomer selected from the group consisting of vinyl acetate, acrylic and methacrylic acids and esters thereof and maleate esters, (b) blends of said copolymers, and (c) blends of polyethylene homopolymer and at least one of said copolymers, and S is a grafted side chain having brominated monomeric unites of the formula:

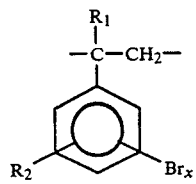

wherein $x = 1$ to 4, $R_1$ is H or $CH_3$, and $R_2$ is H or a $C_{1-4}$ lower alkyl group.

* * * * *

UNITED STATES PATENT AND TRADEMARK OFFICE
CERTIFICATE OF CORRECTION

PATENT NO. : 5,036,129  
DATED : July 30, 1991  
INVENTOR(S) : Ray Atwell, et al Page 1 of 2

It is certified that error appears in the above-identified patent and that said Letters Patent is hereby corrected as shown below:

In column 1, line 7 "composite" should be --compositions--.

In column 2, line 58 "R1" should be --$R_1$--.

In column 4, line 34 after the word alkyl please add --group.--.

In column 5, line 67 "bY" should be --by--.

In column 6, line 62 "EvA" should be --EVA--.

In column 9, line 15 "field on 04/17/, 1990." shouold be --filed on 04/17/90.--

In column 9, line 31 "EvA" should be --EVA--.

In column 9, line 34 "if using" should be --of using--.

In column 10, line 8 "Polymeric" should be --polymeric--.

In column 11, line 55 please insert footnote 7 prior to --125° C.--.

In column 11, line 59 "reacting" should be --reaction--.

In column 11, line 68 "obtianed." should be --obtained.--.

In column 12, line 27 please insert after footnote 5 and before EVA the term --50%--.

UNITED STATES PATENT AND TRADEMARK OFFICE
CERTIFICATE OF CORRECTION

PATENT NO. : 5,036,129

DATED : July 30, 1991

INVENTOR(S) : Ray Atwell, et al

It is certified that error appears in the above-identified patent and that said Letters Patent is hereby corrected as shown below:

In column 14, line 48 "wherein x 1 to 4," should be --wherein x=1 to 4,--.

Signed and Sealed this

Eleventh Day of May, 1993

Attest:

MICHAEL K. KIRK

*Attesting Officer*  *Acting Commissioner of Patents and Trademarks*